United States Patent [19]

Sato

[11] Patent Number: 4,776,617
[45] Date of Patent: Oct. 11, 1988

[54] TELESCOPIC SWIVEL PIPE JOINT

[75] Inventor: Toshiyuki Sato, Daito, Japan

[73] Assignee: Kabushiki Kaisha Suiken Technology, Osaka, Japan

[21] Appl. No.: 13,350

[22] Filed: Feb. 11, 1987

[30] Foreign Application Priority Data

Feb. 14, 1986 [JP] Japan ............................. 61-20734[U]

[51] Int. Cl.$^4$ ............................................. F16L 27/04
[52] U.S. Cl. .................................... 285/165; 285/166; 285/302; 285/906
[58] Field of Search ............... 285/164, 165, 166, 167, 285/31, 32, 19, 15, 298, 906, 302

[56] References Cited

U.S. PATENT DOCUMENTS

| | | | |
|---|---|---|---|
| 634,344 | 10/1899 | Henning | 285/302 X |
| 666,316 | 1/1901 | Kenneally | 285/31 |
| 2,021,317 | 11/1935 | McFarland et al. | 285/298 X |
| 2,538,683 | 1/1951 | Guiler et al. | 285/906 |
| 4,549,756 | 10/1985 | Basile | 285/31 |

FOREIGN PATENT DOCUMENTS

| | | | |
|---|---|---|---|
| 1039798 | 9/1958 | Fed. Rep. of Germany | 285/166 |
| 57-173683 | 10/1982 | Japan . | |
| 2066399 | 7/1981 | United Kingdom | 285/166 |

*Primary Examiner*—Dave W. Arola
*Attorney, Agent, or Firm*—Birch, Stewart, Kolasch & Birch

[57] ABSTRACT

A telescopic swivel pipe joint for coupling a pair of axially spaced pipes each having a connection end comprising a pair of joint connectors each connected to the connection end of a corresponding pipe and having a spherical bearing surface, a pair of main joint tubes each having a cylindrical portion and provided at one end thereof with an integral spherical portion for slidable contact with the bearing surface of a corresponding joint connector, and an auxiliary joint tube removably connected at both ends thereof to the respective cylindrical portions of the main joint tubes, wherein the auxiliary joint tube is telescopic in itself or telescopically fitted at one end thereof to the cylindrical portion of a corresponding main joint tube.

21 Claims, 5 Drawing Sheets

TELESCOPIC SWIVEL PIPE JOINT

BACKGROUND OF THE INVENTION

1. Field of the Invention

This invention relates to a telescopic swivel pipe joint for coupling a pair of axially spaced pipes to constitute, for example, a water supply line which does not break even in the event of earthquake or ground subsidence, and more particularly to an improved telescopic swivel pipe joint which is capable of providing ready adjustment in the degree of allowable telescopic swivel movement.

2. Description of the Prior Art

As is well known, pipe lines which are laid in the ground are often adversely affected by various factors. Most serious of these adverse factors are earthquake and ground subsidence because they can cause breakage of the pipe line.

To avoid or alleviate the adverse influences of earthquake and ground subsidence, West German patent publication No. 1039798 (Patented: Sept. 25, 1958; Inventors: Hans Kreidel, et al) proposes a swivel pipe joint which has such a construction as shown in FIG. 7 of the accompanying drawings.

Referring to FIG. 7, the swivel joint of the West German publication comprises a pair of joint sockets 100a, 100b respectively connected to a pair of pipe ends (not shown). Each joint socket 100a (100b) consists of two detachable parts 101a, 102a (101b, 102b) which, when assembled, internally provides a spherically concave bearing surface 103a (103b) to slidably support a spherical body 104a (104b).

The swivel joint further includes a pair of joint tubes 105a, 105b each screwed at one end thereof to a corresponding spherical body 104a (104b), so that the joint tube is swiveable or universally movable relative to the joint socket. The other end of each joint tube 105a (105b) is screwed to an intermediate tube 106 to make a non-expansible but adjustable connection to the other joint tube 105b (105a).

In application of the above described swivel joint, the overall length of the joint (the distance between the pair of joint sockets 100a, 100b) is adjusted by turning the intermediate tube 106 prior to laying down the joint in the ground. However, once adjusted and laid down in the ground, the swivel joint is no longer extensible nor compressible, so that the joint or the pipes connected thereto may break under tension and compression attendant with earthquake or ground subsidence. Further, the non-expansibility of the joint poses a vital limitation on the swivel movement of the joint which has been laid in the ground.

Japanese patent application laid-open No. 57-173683 (Laid-open: Oct. 26, 1982; Application No.: 56-58795; Filed: Apr. 18, 1981; Applicant: Kabushiki Kaisha Suiken, et al; Inventor: Toshiyuki SATO) discloses a telescopic swivel pipe joint which has overcome the disadvantages of the non-extensible swivel pipe and which is illustrated in FIGS. 8 and 9 of the accompanying drawings.

Referring to FIGS. 8 and 9, the telescopic swivel joint comprises a pair of spherical joint connectors 200a, 200b respectively connected to a pair of pipe ends 201a, 201b. The joint further includes a pair of joint tubes 202a, 202b each having a cylindrical portion 204a (204b) and a spherical socket portion 203a (203b) swivelably fitted on a corresponding joint connector 200a (200b). The cylindrical portion 204a of one joint tube 202a has a radially outward annular projection 205 and is slidably or telescopically fitted in the cylindrical portion 204b of the other joint tube 202b which is provided with a pair of radially inward annular projections 206, so that the two joint tubes are axially slidable within a limited stroke l relative to each other.

Because of the telescopic expansibility, the above joint ensures swivel movement of a maximum amplitude h (FIG. 9) which is determined by a maximum length L of the joint and the axial stroke l, thereby preventing breakage of or damage to the joint at the time of earthquake or ground subsidence.

When the ground in which the telescopic swivel joint is to be laid is weak, the maximum amplitude or allowable level deviation h of the joint must naturally be increased. In other words, the maximum amplitude h must be selected depending on particular ground conditions to constitute a pipe line which is most suited to such ground conditions.

Since the maximum amplitude h of the telescopic swivel joint is determined by the maximum length L and the axial stroke l as described before, it is necessary to replace at least one of the joint tubes 202a, 202b by another differently dimensioned joint tube. However, such replacement requires costly redesigning and manufacture of the new joint tube particularly due to the spherical socket portion (see 203a, 203b in FIG. 8) which necessitates precision to ensure smooth swivel movement.

SUMMARY OF THE INVENTION

It is, therefore, an object of the present invention to provide a telescopic swivel joint which enables ready alteration in the maximum amplitude of swivel movement without requiring replacement of costly parts.

According to one aspect of the invention, there is provided a telescopic swivel pipe joint for coupling a pair of axially spaced pipes each having a connection end comprising a pair of joint connectors each connected to the connection end of a corresponding pipe and having a spherical bearing surface, a pair of main joint tubes each having a cylindrical portion and provided at one end thereof with an integral spherical portion for slidable contact with the bearing surface of a corresponding joint connector, auxiliary joint tube means removably connected at both ends thereof to the respective cylindrical portions of the main joint tubes, and at least one of the auxiliary joint tube means being axially slidably fitted to the cylindrical portion of a corresponding main joint tube.

It must be stresses here that the intermediate tube 106 illustrated in FIG. 7 cannot be modified to slidably fit on the joint tubes 105a, 105b because the essential feature of West German publication No. 1039798 resides in the ability of adjustably setting the overall length of the swivel joint by turning the intermediate tube 106 and thus absolutely requires the intermediate tube to be in screw engagement with the respective joint tubes. In other words, the adoption of such modification to reach at the arrangement of the present invention is against the teaching of the West German patent.

According to another aspect of the invention, there is provided a telescopic swivel joint for coupling a pair of axially spaced pipes each having a connection end comprising a pair of joint connectors each connected to the connection end of a corresponding pipe and having a spherical bearing surface, a pair of main joint tubes each having a cylindrical portion and provided at one end thereof with an integral spherical portion for slidable contact with the bearing surface of a corresponding joint connector, auxiliary joint tube means removably connected at both ends thereof to the respective cylindrical portions of the main joint tubes, and the auxiliary joint tube means comprises at least two tube segments each having one end axially slidably fitted to one end of the other tube segment.

Other objects, features and advantages of the invention will become apparent from the following detailed description given with reference to the accompanying drawings.

DESCRIPTION OF THE PREFERRED EMBODIMENTS

Figure 1:
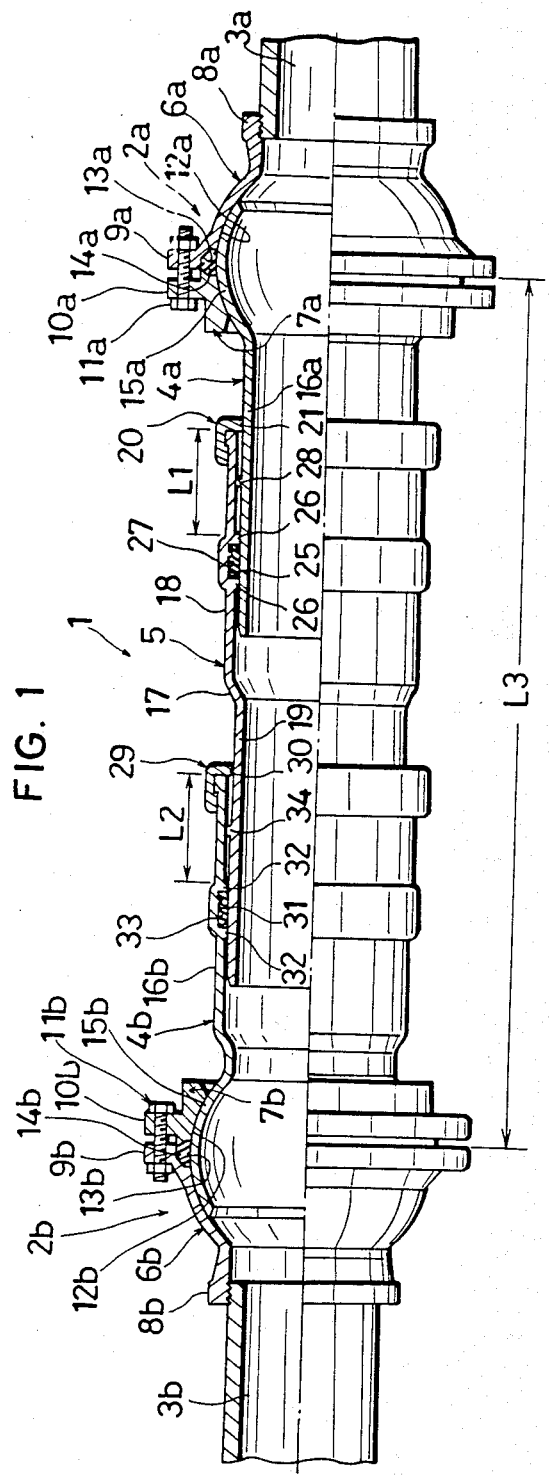
FIG. 1 is a front view, partly in longitudinal section, of a telescopic swivel pipe joint embodying the invention.

Throughout the accompanying drawings, identical or similar parts are represented by the same reference numerals and characters.

Figure 2:
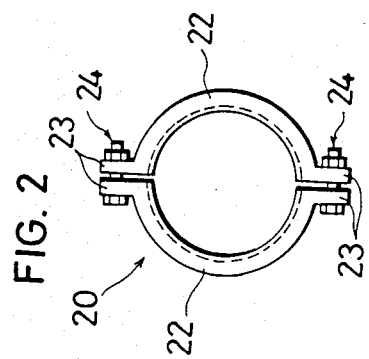
FIG. 2 is a side elevation showing an auxiliary ring employed in the same joint.

Referring now to FIGS. 1 and 2 of the accompanying drawings, a telescopic swivel pipe joint generally represented by reference numeral 1 comprises a pair of joint connectors 2a, 2b in the form of sockets respectively mounted to each end of pipes 3a, 3b to be coupled together. The joint 1 further comprises a pair of main joint tubes 4a, 4b and an auxiliary tube 5 as hereinafter described.

Each joint socket 2a (2b) includes a main body 6a (6b) and an auxiliary ring 7a (7b). The main body is provided at one end with a mount portion 8a (8b) fixed to a corresponding pipe 3a (3b) and at the other end with an annular flange 9a (9b). The auxiliary ring is also formed with an annular flange 10a (10b) which is opposed to the annular flange of the main body. The main body and the auxiliary ring are detachably connected together through a suitable fixing means 11a (11b) such as bolt and nut by utilizing the respective annular flanges.

When assembled, the joint socket 2a (2b) internally provides a spherically concave bearing surface 12a (12b) which is formed at an intermediate position thereof with an annular seating recess 13a (13b) for receiving an annular packing 14a (14b).

Each main joint tube 4a (4b) has an integral, spherically bulging end portion 15a (15b) which is swivelably fitted in a corresponding joint socket 2a (2b). As is readily appreciated, the packing 14a (14b) seals between the bulging tube end portion and the joint socket regardless of the angular position of the main joint tube 4a (4b).

Each main joint tube 4a (4b) further has an integral cylindrical portion 16a (16b) which extends toward the cylindrical portion 16b (16a) of the other main joint tube 4b (4a).

The auxiliary joint tube 5 is generally cylindrical but has an intermediate annular stepped portion 17 to provide a diametrically larger portion 18 and a diametrically smaller portion 19. The larger portion 18 slidably fits around the cylindrical portion 16a of one main joint tube 4a (hereinafter often referred to as "first main joint tube 4a"), whereas the smaller portion 19 slidably fits in the cylindrical portion 16b of the other main joint tube 4b (hereinafter often referred to as "second main joint tube 4b").

An annular stopper 20 having a radially inward annular stopper projection 21 is mounted to the larger diameter end of the auxiliary joint tube 5. According to this example, the stopper 20 comprises a pair of semicircular half segments 22 each provided at both ends thereof with connecting flanges 23 which are opposed to the corresponding flanges of the other half segment, as illustrated in FIG. 2. Each opposed pair of flanges 23 are connected together by a suitable fixing means 24 such as bolt and nut to provide the annular stopper 20 which is removable from the auxiliary joint tube 5 when required.

The larger diameter portion 18 of the auxiliary joint tube 5 is formed at an intermediate position thereof with an annular seating recess 25 which is defined by a pair of axially spaced, radially inward annular projections 26 for receiving an annular packing 27.

The cylindrical portion 16a of the first main joint tube 4a is formed at an intermediate position thereof with a radially outward annular projection 28 which is engageable with the inward projection 21 of the annular stopper 20 and with the inward annular projection 26 positioned closer to the annular stopper 20. Thus, the first main joint tube 4a is axially slidable, within a limited stoke L1, relative to the auxiliary joint tube 5 while the packing 27 seals the clearance between these two parts.

Similarly to the larger diameter portion 18 of the auxiliary joint tube 5, the cylindrical portion 16b of the second main joint tube 4b is provided at its non-bulged end with an annular stopper 29 which is substantially identical in structure to the aforementioned stopper 20 and thus has a radially inward annular stopper projection 30. Further, the cylindrical portion of the second main joint tube is intermediately formed with an annular seating recess 31 defined by a pair of radially inward annular projections 32 for receiving an annular packing 33.

The small diameter portion 19 of the auxiliary joint tube 5 is formed at an intermediate portion thereof with a radially outward annular projection 34 which is engageable with the inward projection 30 of the second mentioned stopper 29 and with one of the recess defining annular projections 32 positioned closer to the stopper 29. Thus, the second main joint tube 4b is also axially slidable, within a limited stroke L2, relative to the auxiliary joint tube 5 while the second mentioned packing 33 seals the clearance between these two parts.

In operation of the pipe joint 1 described above, since both of the main joint tubes 4a, 4b are axially or telescopically movable relative to the auxiliary joint tube 5, the connection of the main joint tubes by means of such auxiliary joint tube poses no hinderance to smooth swivel movement of the main joint tubes relative to the respective joint sockets 2a, 2b. Therefore, in the event of earthquake or ground subsidence, the pipes 3a, 3b can come out of mutual alignment (FIG. 1) without any damage to the pipes and the joint while retaining parallelism between the pipes.

Figure 3:
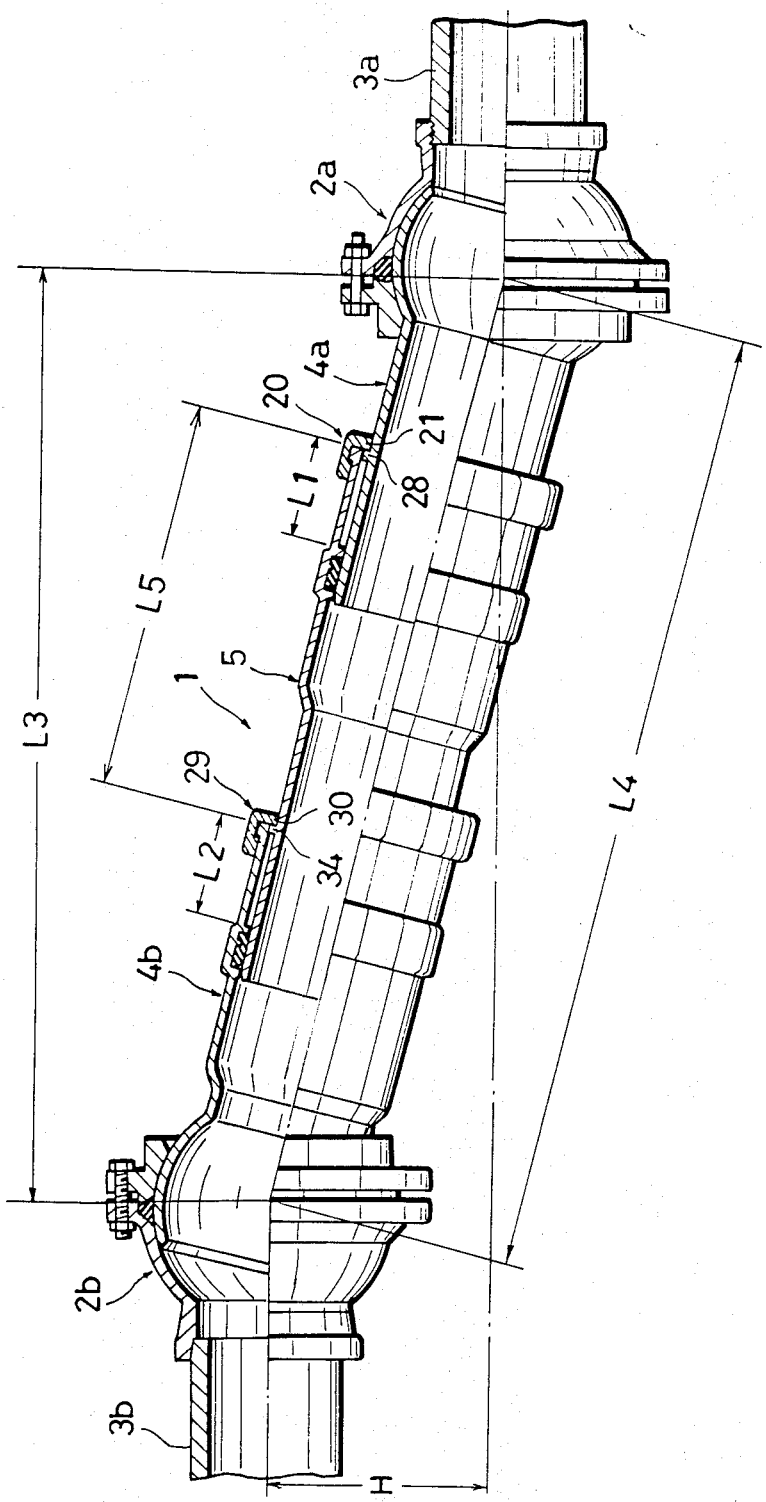
FIG. 3 is a view similar to FIG. 1 but showing the same joint after swivel movement.

It is now assumed that the annular outward projections 28, 34 of the first and second main joint tubes 4a, 4b are initially positioned in the center of the respective axial strokes L1, L2, as shown in FIG. 1. Under this condition, a maximum allowable deviation H (FIG. 3) from mutual alignment between the two pipes 3a, 3b is represented by the following equation.

$$H = \sqrt{L4^2 - L3^2} = \sqrt{(L3 + \tfrac{1}{2}L1 + \tfrac{1}{2}L2)^2 - L3^2}$$

where L3 is the initial distance between the two joint sockets 2a, 2b while L4 is the post-deviation distance between the joint sockets 2a, 2b.

From the above equation, it is apparent that the maximum deviation H is determined by the axial strokes L1, L2. Further, since the initial and post-deviation distances L3, L4 between the joint sockets 2a, 2b are governed by an effective length L5 of the auxiliary joint tube 5 which is the distance between the inward stopper injection 21 and the outward projection 34, the maximum deviation H is also determined by such effective length of the auxiliary joint tube.

Since the axial stroke L1 and the effective length L5 of the above described parameters are associated only with the auxiliary joint tube 5, it is possible to alter the maximum deviation H by simply replacing the auxiliary joint tube 5 by another differently dimensioned auxiliary joint tube. It is to be noted in this connection that such another auxiliary joint tube is easy to manufacture because of its simple tubular shape, thereby leading to cost reduction. Further, the annular stoppers 20, 29 and the annular packings 27, 33 require no replacement, hence additional reduction in cost.

Naturally, the above described adjustment of the maximum deviation H does not require time-taking and costly replacement of the main joint tubes 4a, 4b having the spherically bulged end portions 15a, 15b.

If desired, the auxiliary joint tube 5 may be modified to have its both ends slidably fitting around or in the respective cylindrical portions 16a, 16b of the main joint tube 4a, 4b. In this case, both of the main joint tubes may be identical in dimension and configuration while the auxiliary joint tube may be constant in diameter throughout its entire length.

Figure 4:
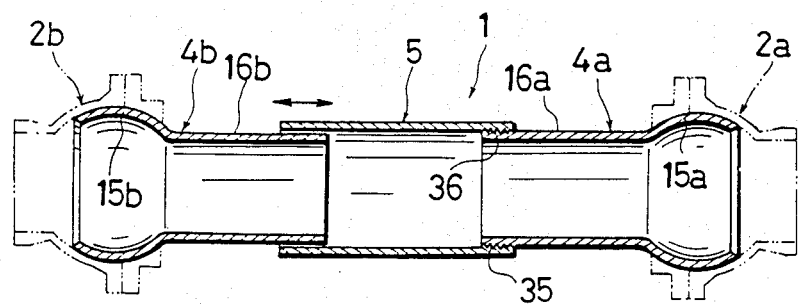
FIG. 4 is a schematic front view, in longitudinal section, of a modified telescopic swivel pipe joint embodying the invention.

In a modification schematically illustrated in FIG. 4, a first main joint tube 4a has a cylindrical portion 16a which is provided with an externally threaded end 35 for removable engagement with an internally threaded end 36 of an auxiliary joint tube 5. The other end of the auxiliary joint tube 5 slidably fits around the cylindrical portion 16b of a second main joint tube 4b. A similar structure (annular stopper, annular packing, etc.) as shown in FIG. 1 may be adopted for limiting the relative telescopic movement between the auxiliary joint tube 5 and the second main joint tube 4b and for sealing the clearance between these parts.

Figure 5:
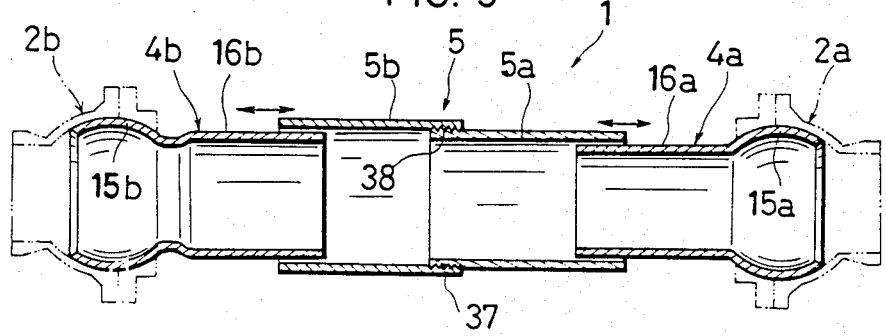
FIG. 5 is a view similar to FIG. 4 but illustrating another modified telescopic swivel pipe joint according to the invention.

FIG. 5 schematically shows another modification in which an auxiliary joint tube 5 consists of two separate tube segments, that is, a diametrically smaller tube segment 5a and a diametrically larger tube segment 5b. The smaller diameter segment 5a is formed with an externally threaded end 37 for removable engagement with an internally threaded end 38 of the larger diameter segment 5b. The other end of the smaller diameter segment 5a slidably fits around the cylindrical portion 16a of a first main joint tube 4a. Likewise, the other end of the larger diameter segment 5b slidably fits around the cylindrical portion 16b of a second main joint tube 4b. A similar structure as shown in FIG. 1 may be employed for limiting the axial telescopic movement of the auxiliary tube 5 relative to each of the main joint tubes 4a, 4b and for sealing the clearance between these parts.

According to the modification of FIG. 5, a maximum allowable level deviation between a pair of pipes (not shown) to be coupled can be varied by replacing either or both of the auxiliary tube segments 5a, 5b. Such a modification is advantageous in that the two segment auxiliary joint tube 5 is easier in handling (assembly) than a single piece auxiliary joint tube because the individual tube segments 5a, 5b, which are lighter than the single piece tube, can be handled separately, thereby enabling a greater overall length of the auxiliary joint tube 5. Naturally, this advantage becomes more pronounced if the auxiliary joint tube 5 consists of three or more tube segments.

Figure 6:
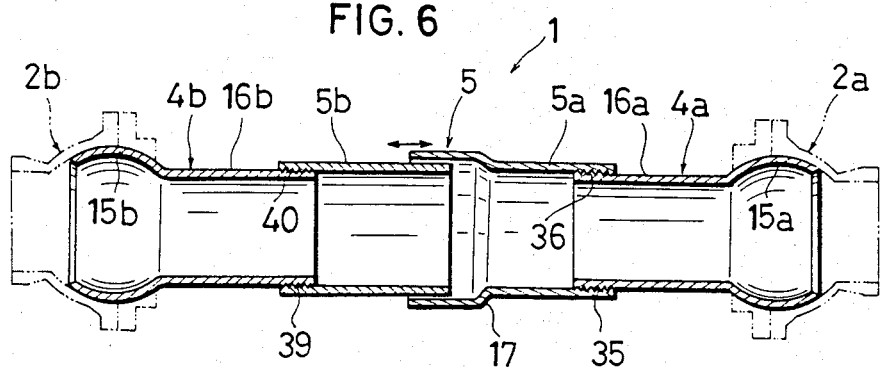
FIG. 6 is a view also similar to FIG. 4 but illustrating a further modified telescopic swivel pipe joint according to the invention.
Figure 7:
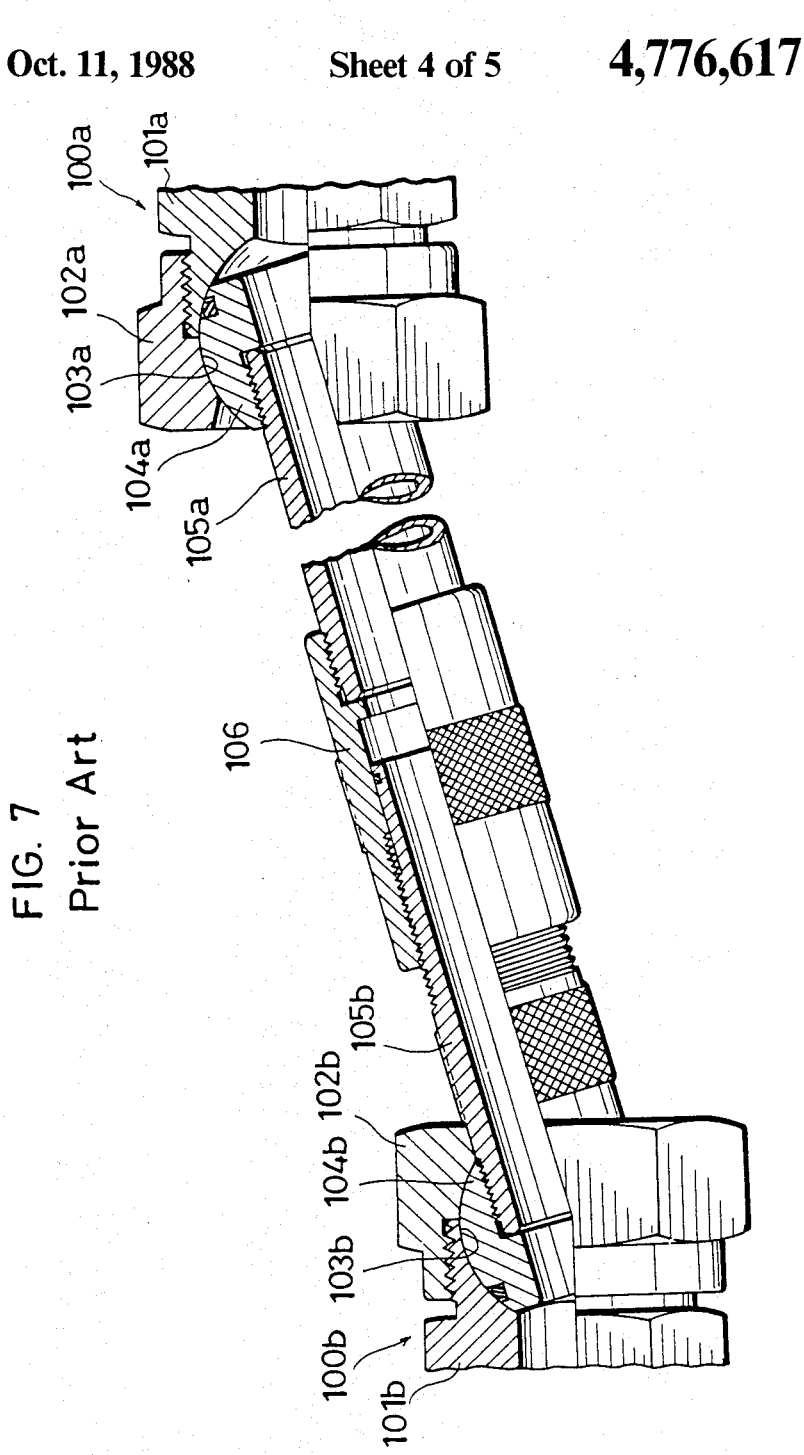
FIG. 7 is a front view, partly in longitudinal section and partly cut away, of a prior art swivel pipe joint.
Figure 8:
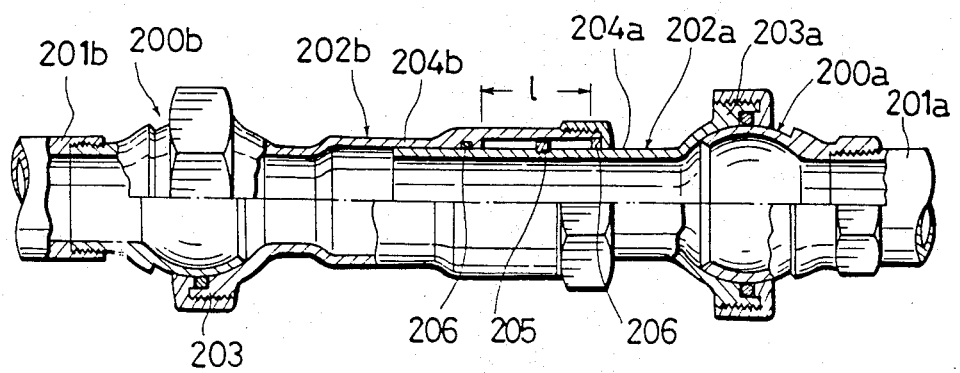
FIGS. 8 and 9 are front views, partly in longitudinal section, showing a prior art telescopic swivel pipe joint before and after swivel movement, respectively.
Figure 9:
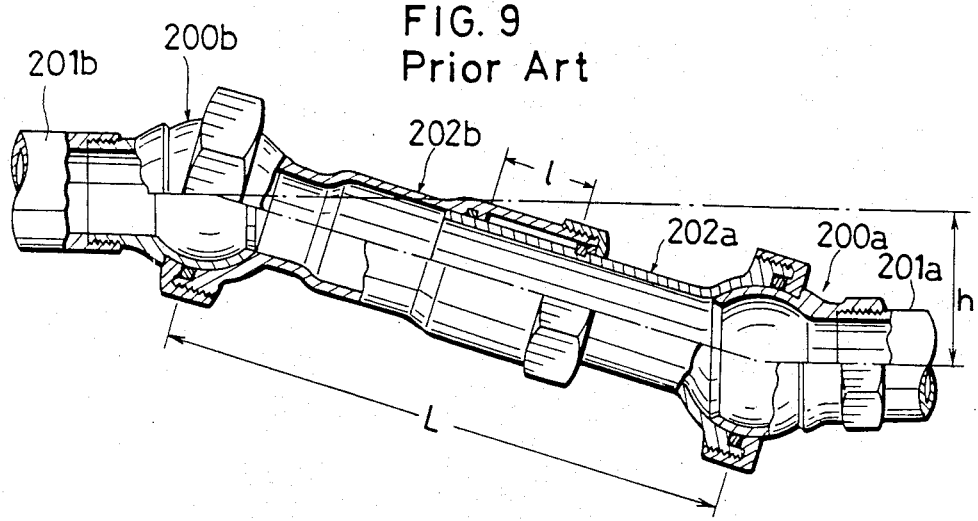

FIG. 6 illustrates a further modification in which an auxiliary joint tube 5, like the modification of FIG. 5, consists of two tube segments, that is, a socket type tube segment 5a and a spigot type tube segment 5b. The socket segment 5a is diametrically reduced or annularly stepped at 17 and has an internally threaded end 36 for removable engagement with an externally threaded end 35 of a first main joint tube 4a. The spigot segment 5b also has an internally threaded end 40 for removable engagement with an externally threaded end 39 of a second main joint tube 4b. The other end or larger opening mouth of the socket segment 5a slidably fits around the other end of the spigot segment 5b, so that the auxiliary joint tube 5 itself is telescopically expansible to provide the intended advantages of the present invention.

As appreciated from the foregoing description, the essential feature of the present invention resides in that the pair of main joint tubes 4a, 4b are coupled together by means of the auxiliary joint tube 5 which is telescopic in itself or telescopically connected to at least one of the main joint tubes and which is removable from the main joint tubes for replacement. Thus, as far as this feature is retained, the configuration and material of the joint sockets 2a, 2b, the main joint tubes 4a, 4b and the auxiliary joint tube 5 are optional according to the requirements of a particular application. Further, the provision of the annular stoppers 20, 29 and the radially outward annular projections 28, 34 for limiting the telescopic axial expansion of the joint 1 is not always necessary though preferable for practical use.

In addition to being used in water supply lines, the universal telescopic pipe joint according to the present invention is also usable for any other piping applications (gas supply lines, oil transfer lines, etc.) in which flexibility of the lines is absolutely called for.

The invention being thus described, it will be obvious that the same may be varied in many other ways than already described. For instance, the example illustrated in FIG. 6 may be further modified so that the tube segments 5a, 5b of the auxiliary joint tube 5 slidably fit around or in the first and second main joint tubes 4a, 4b, respectively, to afford more expansibility of the overall joint 1. Moreover, the auxiliary joint tube 5 may consist of three or more tube segments which are connected to one another to have at least one telescopic connection. Such variations are not to be regarded as a departure from the spirit and scope of the invention, and all such modifications as would be obvious to those skilled in the art are intended to be included within the scope of the following claims.

I claim:

1. A telescopic swivel pipe joint for coupling a pair of axially spaced pipes each having a connection end comprising:
   a pair of joint connectors each connected to said connection end of a corresponding pipe and having a spherical bearing surface;
   a pair of main joint tubes each having a cylindrical portion and provided at one end thereof with an integral spherical portion for slidable contact with said bearing surface of a corresponding joint connector;
   auxiliary joint tube means removable connected at both ends thereof to the respective cylindrical portions of said main joint tubes, said auxiliary joint tube means being substantially constant in diameter throughout its entire length; and
   at least one end of said auxiliary joint tube means being axially slidably fitted to the cylindrical portion of a corresponding main joint tube so that the distance between the spherical portions of the respective main joint tubes is variable in response to an axial force applied to the pipe joint, the other end of said auxiliary joint tube means being detachably screwed to the cylindrical portion of a corresponding main joint tube.

2. The pipe point as defined in claim 1, wherein each joint connector is in the form of a socket which comprises a main body fixed to said connection end of a corresponding pipe and an auxiliary ring detachably fixed to said main body.

3. The pipe joint as defined in claim 2, wherein said bearing surface of each joint connector is provided by a spherically concave surface of said socket, and said spherical portion of each main joint tube is slidably received in said socket.

4. A telescopic swivel pipe joint for coupling a pair of axially spaced pipes each having a connection end comprising:
   a pair of joint connectors each connected to said connection end of a corresponding pipe and having a spherical bearing surface;
   a pair of main joint tubes each having a cylindrical portion and provided at one end thereof with an integral spherical portion for slidable contact with said bearing surface of a corresponding joint connector;
   auxiliary joint tube means removable connected at both ends thereof to the respective cylindrical portions of said main joint tubes; and
   at least one end of said auxiliary joint tube means being axially slidably fitted to the cylindrical portion of a corresponding main joint tube so that the distance between the spherical portion of the respective main joint tubes is variable in response to an axial force applied to the pipe joint, wherein said larger diameter portion is provided with an annular end stopper having a radially inward annular stopper projection which is engageable with a radially outward annular projection provided at an intermediate position of the cylindrical portion of said one main joint tube, and
   the cylindrical portion of said other main joint tube is also provided with an annular end stopper having a radially inward annular stopper projection which is engageable with a radially outward annular projection provided at an intermediate position thereof of said smaller diameter portion.

5. The pipe joint as defined in claim 4, wherein each annular end stopper comprises a pair of semicircular half segments which are detachably connected together.

6. A telescopic swivel pipe joint for coupling a pair of axially spaced pipes each having a connection end comprising:
   a pair of joint connectors each connected to said connection end of a corresponding pipe and having a spherical bearing surface;
   a pair of main joint tubes each having a cylindrical portion and provided at one end thereof with an integral spherical portion for slidable contact with said bearing surface of a corresponding joint connector;
   auxiliary joint tube means removably connected at both ends thereof to the respective cylindrical portions of said mean joint tubes; and
   said auxiliary joint tube means comprises at least two tube segments each having one end axially slidable fitted to one end of the other tube segment so that the distance between the spherical portions of the respective main joint tubes is variable in response to an axial force applied to the pipe joint.

7. The pipe joint as defined in claim 6, wherein the other end of each tube segment is removably screwed to the cylindrical portion of a corresponding main joint tube.

8. The pipe joint as defined in claim 6, wherein each joint connector is in the form of a socket, said bearing surface of the connector is provided by a spherically concave surface of said socket, and said spherical portion of each main joint tube is in the form of an integral end bulge slidably received in said socket.

9. A telescopic swivel pipe joint for coupling a pair of axially spaced pipes each having a connection end comprising:
   a pair of joint connectors each connected to said connection end of a corresponding pipe and having a spherical bearing surface;
   a pair of main joint tubes each having a cylindrical portion and provided at one end thereof with an integral spherical portion for slidable contact with said bearing surface of a corresponding joint connector;
   auxiliary joint tube means removable connected at both ends thereof to the respective cylindrical portions of said main joint tubes; and
   at least one end portion of said auxiliary joint tube means being axially slidable fitted in the cylindrical portion of a corresponding main joint tube so that the distance between the spherical portions of the respective main joint tubes is variable in response to an axial force applied to the pipe joint, and the cylindrical portion of said corresponding main joint tube being provided with an annular end stopper having a radially inward annular stopper projection which is engageable with a radially outward annular projection provided at an intermediate position of said one end portion of said auxiliary joint tube means.

10. The pipe joint as defined in claim 9, wherein said annular end stopper comprises a pair of semicircular half segments which are detachably connected together.

11. The pipe joint as defined in claim 9, wherein each joint connector is in the form of a socket which comprises a main body fixed to said connection end of a corresponding pipe and an auxiliary ring detachably fixed to said main body.

12. The pipe joint as defined in claim 11, wherein
said bearing surface of each joint connector is provided by a spherically concave surface of said socket, and
said spherical portion of each main joint tube is slidably received in said socket.

13. A telescopic swivel pipe joint for coupling a pair of axially spaced pipes each having a connection end comprising:
a pair of joint connectors each connected to said connection end of a corresponding pipe and having a spherical bearing surface;
a pair of main joint tubes each having a cylindrical portion and provided at one end thereof with an integral spherical portion for slidable contact with said bearing surface of a corresponding joint connector;
auxiliary joint tube means removable connected at both ends thereof to the respective cylindrical portions of said main joint tubes; and
at least one end portion of said auxiliary joint tube means being axially slidably fitted around the cylindrical portion of a corresponding main joint tube so that the distance between the spherical portions of the respective main joint tubes is variable in response to an axial force applied to the pipe joint, and
said one end portion of said auxiliary joint tube means being provided with an annular end stopper having a radially inward annular stopper projection which is engageable with an radially outward annular projection provided at an intermediate position of said cylindrical portion of said corresponding main joint tube.

14. The pipe joint as defined in claim 13, wherein said annular end stopper comprises a pair of semicircular half segments which are detachably connected together.

15. The pipe joint as defined in claim 13, wherein each joint connector is in the form of a socket which comprises a main body fixed to said connection end of a corresponding pipe and an axially ring detachably fixed to said main body.

16. The pipe joint as defined in claim 15, wherein
said bearing surface of said joint connector is provided by a spherically concave surface of said socket, and
said spherical portion of each main joint tube is slidably received in said socket.

17. A telescopic swivel pipe joint for coupling a pair of axially spaced pipes each having a connection end comprising:
a pair of joint connectors each connected to said connection end of a corresponding pipe and having a spherical bearing surface;
a pair of main joint tubes each having a cylindrical portion and provided at one end thereof with an integral spherical portion for slidable contact with said bearing surface of a corresponding joint connector;
auxiliary joint tube means removably connected at both ends thereof to the respective cylindrical portions of said main joint tubes;
said auxiliary joint tube means including a larger diameter portion axially slidably fitting around the cylindrical portion of one main joint tube and a smaller diameter portion axially slidably fitting in the cylindrical portion of the other main joint tube so that the distance between the spherical portions of the respective main joint is variable in response to an axial force applied to the pipe joint;
said larger diameter portion being provided with an annular end stopper having a radially inward annular stopper projection which is engageable with a radially outward annular projection provided at an intermediate position of the cylindrical portion of said one main joint tube; and
the cylindrical portion of said other main joint tube being also provided with an annular end stopper having a radially inward annular stopper projection which is engageable with a radially outward annular projection provided at an intermediate position thereof of said smaller diameter portion.

18. The pipe joint as defined in claim 17, wherein each annular end stopper comprises a pair of semicircular half segments which are detachably connected together.

19. The pipe joint as defined in claim 17, wherein each joint connector is in the form of a socket which comprises a main body fixed to said connection end of a corresponding pipe and an auxiliary ring detachably fixed to said main body.

20. The pipe joint as defined in claim 19, wherein
said bearing surface of each joint connector is provided by a spherically concave surface of said socket, and
said spherical portion of said main joint tube is slidably received in said socket.

21. A telescopic swivel pipe joint for coupling a pair of axially spaced pipes each having a connection end comprising:
a pair of joint connectors each connected to said connection end of a corresponding pipe and having a spherical bearing surface;
a pair of main joint tubes each having a cylindrical portion and provided at one end thereof with an integral spherical portion for slidable contact with said bearing surface of a corresponding joint connector;
auxiliary joint tube means removable connected at both ends thereof to the respective cylindrical portions of said main joint tubes, said auxiliary joint tube means comprises at least two tube segments which are detachably screwed to each other; and
at least one end of said auxiliary joint tube means being axially slidably fitted to the cylindrical portion of a corresponding main joint tube so that the distance between the spherical portion of the respective main joint tubes is variable in response to an axial force applied to the pipe joint.

* * * * *